(12) United States Patent
Tang

(10) Patent No.: US 6,525,717 B1
(45) Date of Patent: Feb. 25, 2003

(54) INPUT DEVICE THAT ANALYZES ACOUSTICAL SIGNATURES

(75) Inventor: Denny Duan-lee Tang, Saratoga, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/465,746

(22) Filed: Dec. 17, 1999

(51) Int. Cl.$^7$ .................................................. G09G 5/00
(52) U.S. Cl. ...................... 345/177; 345/173; 345/773; 345/168; 345/169; 178/18.04
(58) Field of Search ................................. 345/177, 173, 345/773, 168, 169; 178/18.04

(56) References Cited

U.S. PATENT DOCUMENTS

| | | | | |
|---|---|---|---|---|
| 4,430,644 A | * | 2/1984 | Blanchard et al. | 178/17 C |
| 4,791,416 A | * | 12/1988 | Adler | 310/313 D |
| 5,058,046 A | | 10/1991 | Lapeyre | 364/709.16 |
| 5,378,069 A | | 1/1995 | Bowen | 400/477 |
| 5,574,482 A | * | 11/1996 | Niemeier | 345/168 |
| 5,591,945 A | * | 1/1997 | Kent | 178/18.04 |
| 5,764,794 A | | 6/1998 | Perlin | 382/186 |
| 5,767,842 A | | 6/1998 | Korth | 345/168 |
| 5,797,098 A | * | 8/1998 | Schroeder et al. | 379/355.05 |
| 5,854,450 A | * | 12/1998 | Kent | 178/18.01 |
| 6,011,554 A | * | 1/2000 | King et al. | 345/168 |

FOREIGN PATENT DOCUMENTS

| | | |
|---|---|---|
| JP | 06214712 | 8/1994 |
| JP | 09054646 | 2/1997 |
| JP | 09330175 | 12/1997 |

OTHER PUBLICATIONS

IBM Technical Disclosure Bulleting, vol. 20, No. 4, Sep. 1977.

IBM Technical Disclosure Bulleting, vol. 20, No. 7, Dec. 1977.

IBM Technical Disclosure Bulleting, vol. 32, No. 10B, Mar. 1990.

IBM Technical Disclosure Bulleting, vol. 36, No. 11, Nov. 1993.

* cited by examiner

Primary Examiner—Bipin Shalwala
Assistant Examiner—Jimmy H. Nguyen
(74) Attorney, Agent, or Firm—Lacasse & Associates, LLC; Randy W. Lacasse; Khan G. Tran, Esq.

(57) ABSTRACT

A virtual input device uses the acoustical signature of the user's fingers to determine which character is selected. Rows of acoustical sensors having different acoustical properties are spaced in the vertical direction. When a user touches a specific row with a particular finger a unique acoustical signature is produced. The acoustical signature is analyzed to determine the finger used, the row, and the specific action by the finger, e.g. slide, press, tap. The combinations of the row, finger and action define the character selected. The characters are associated with the combinations in such a way to provide a traditional keyboard setup. Visual feedback of the character selected is provided by a display device of the system.

10 Claims, 8 Drawing Sheets

INPUT DEVICE THAT ANALYZES ACOUSTICAL SIGNATURES

BACKGROUND OF THE INVENTION

1. Field of Invention

The present invention relates generally to the field of input devices. More specifically, the present invention is related to virtual input devices for electronic or computer based systems.

2. Discussion of Prior Art

With conventional keyboards, each character key occupies a specific position on the board. In order to type a character, a user must position their finger at the specified location of the key and press downward. Each of the keys have a finite size and a finite separation must be maintained between the keys so that a user does not strike two keys simultaneously. The need for finite spacing between the keys limits the operational amount a conventional keyboard can be reduced in size and still be operational.

For many electronic devices which require keyboard inputs, a conventional keyboard is not practical. Most portable devices are designed to be small enough so as to be convenient for the user to carry them without undue burden. Pagers, cellular phones and palm top PCs are typically designed so as to fit into a shirt pocket. Portable PCs are designed so as to be conveniently carried by the user in a small case or bag. These devices have limited surface space and accordingly their keyboards are designed with reduced sized keys, with fewer character keys, or the keys are arranged in a different manner than the traditional QWERTY style keyboard. Some devices are operated using a stylus interface. The user points the stylus at one character at a time on a graphic display of a keyboard in order to select the character. For a trained typist, such an interface is exceedingly slow and tedious. Thus it is desirable to have a virtual keyboard which can be typed in a traditional manner, yet is small enough to fit on the surface of a small electronic device.

Devices providing keyboard style entry, allowing touch typing without traditional hard-wired keys, can generally be separated into two groups. The first group focuses on sensing finger motion or gestures by analyzing the image from a monitoring TV camera or electronic glove worn by the user. The finger motions can be the traditional movement of fingers a touch typist would normally undergo to type a character, or specialized gestures such as "pushing", "pulling", or making a circle with the hand may be used for specific inputs. The use of the finger motions and gestures, in combination, provide for a wider range of inputs. The second group uses various measuring techniques to determine the position of the finger on the keypad. By using detectors, the X-Y position of the fingers are determined and, based on this X-Y position a character is input.

When a person taps an object with their finger, a sound is produced. For example, if a wooden board is tapped with a persons index finger we hear the sound produced. The sound is caused by the vibrations induced in the object being transmitted through the air to the human ear which then converts these vibrations into what we perceive as sound. Depending upon which finger is used to tap the object and the properties of the object tapped, different sounds are produced. The different sounds are the result of the vibrations having different characteristics such as different frequency components (spectral characteristics). The sounds are unique to the finger used to tap the object and the object tapped. These unique sounds are termed "acoustical signatures." The present invention recognizes and employs these signatures in the embodiments described.

Some references exemplifying devices providing keyboard style entry without traditional hard-wired keys are discussed below, however, each reference fails to utilize acoustical signatures to determine input parameters.

The U.S. Pat. No. 5,767,842, describes an input device that records the image of the fingers using a TV camera and analyzes the motion of the hand.

The Japanese patent publication No:09054646 describes the use of an electronic glove to determine finger motion.

The Japanese patent publication No:06214712 describes an input device which detects finger motion using electromagnetic waves and ultrasonic waves to determine the key input.

The IBM TDB v.32 No. 10B describes a device that measures the position and motion of the fingers using a device such as a glove worn by the user to determine the characters typed.

The Japanese patent publication No:09330175 describes an input device which uses pressure sensors to locate the fingers and by examining the pressure distribution, finger positions are located. The use of acoustical signatures is not disclosed in this reference.

The U.S. Pat. No. 5,378,069 describes an input device using emitters and detectors to determine the positions of the fingers. The positions of the fingers are used to determine which key is pressed. The use of acoustical signatures of the fingers is not described.

The IBM TDB v20 No.7 describes a touch pad which uses two sheets of flexible material, acoustical wave generators, and acoustical wave receivers. A finger touch to the pad couples the acoustical wave to the top sheet and by measuring the amount of time it takes the wave to reach the acoustical receivers, the position of the finger can be detected. However, this reference does not utilize the unique acoustical signature generated by the fingers.

The IBM TDB v36 No. 11 describes a adaptive algorithm to adjust key positions to fit an individual's preferences. This reference, however, does not describe the physical implementation of a virtual keyboard.

The IBM TDB v20 No. 4 describes a keyboard which has slight indentations in the keyboard in the positions of the keys. By positioning a finger on an indentation, a light sensor detects the position of the finger on the board and determines the key pressed.

The U.S. Pat. Nos. 5,764,794 and 5,058,046 describe stylus type input devices. Pens are used to interface with keyboard or other images on a display device to choose the data to be input.

None of these references teach the concept of recognizing a particular finger by its unique acoustical signature. The use of acoustical signatures allows the analyzing of a reduced set of data with respect to image analysis techniques and eliminates the need for gloves or the like.

Whatever the precise merits, features and advantages of the above cited references, none of them achieve or fulfills the purposes of the present invention. These and other objects are achieved by the detailed description that follows.

SUMMARY OF THE INVENTION

A virtual input device uses an acoustical signature of a user's finger to determine which character is selected.

Acoustical sensors having different acoustical properties are placed in spaced relationship to each other. When a user touches a sensor with a finger, a unique acoustical signature is produced. The acoustical signature is analyzed to determine the finger used, sensor touched, and the specific action by the finger, e.g. slide, press, tap. The combinations of the sensor, finger and action define the character selected. The characters are associated with each combination of sensor, finger and action in such a way that a traditional keyboard is maintained so that a proficient touch typist does not need to re-learn key positions. Visual feedback of the character selected is provided by a display device of the system.

DESCRIPTION OF THE PREFERRED EMBODIMENTS

While this invention is illustrated and described in a preferred embodiment, the device may be produced in many different configurations, forms and materials. There is depicted in the drawings, and will herein be described in detail, a preferred embodiment of the invention, with the understanding that the present disclosure is to be considered as a exemplification of the principles of the invention and the associated functional specifications of the materials for its construction and is not intended to limit the invention to the embodiment illustrated. Those skilled in the art will envision many other possible variations within the scope of the present invention.

When a person strikes an object with one of their fingers, a vibration is induced into the object touched. Due to the fact that each finger is different in shape, size, weight, nail shape and agility, each finger induces an vibration that is different from the vibration induced by the other fingers when touching the object. Objects with different properties such as density or thickness have vibrations of differing characteristics induced when each is touched by the same finger. Typically, these vibrations are coupled to the human ear where they are converted into what we perceive as sound. The characteristics of the vibrations are unique to the finger used to touch the object and the object touched. Some of the characteristics of the vibrations are time duration, frequency components, and amplitude. These characteristics can be used to uniquely identify the vibrations and thus the finger and object touched. The unique vibrations are an acoustical signature of the finger used and object touched.

Certain devices have the capability of converting these vibrations into electrical signals representative of the vibrations, analogous to the conversion into sound. A conventional Electret, which is a polarized Teflon foil with metallic electrodes on two sides, converts the vibrations into electrical signals. The Electret changes in capacitance based upon the vibrations coupled to it. This change in capacitance is used to generate electrical signals representative of the vibrations. Alternatively, metal strips, which are vibrated in a magnetic field by the vibrations coupled to them, convert the vibration to an electrical signal. Such devices are generally known as transducers.

Figure 1:
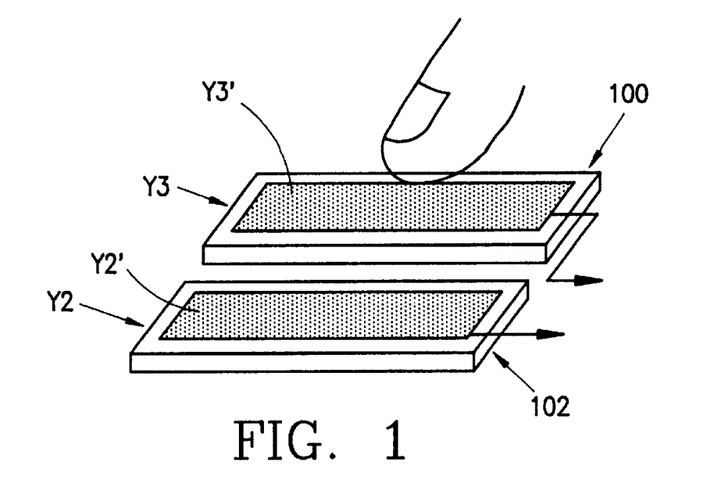
FIG. 1 illustrates acoustical sensors made of different materials.

By providing a stripe of material having specified properties, such as density and thickness, and coupling a transducer, such as an Electret, to the stripe, an acoustical sensor is formed. Preferably, the stripes are formed out of dense materials, such as those used for wind instruments (steel, heavy wood, hard plastic, etc.), as these materials produce vibrations which contain rich harmonic components. Whenever the stripe is touched by a finger, the vibrations induced are coupled to the Electret and converted to electrical signals. Each finger touching the sensor generates a different and unique electrical signal dependant on the acoustical signature. Acoustic sensors having different natural frequencies, and hence having different acoustical signatures for each finger associated with them can be produced. This is shown in FIG. 1. Stripe Y2 has an Electret Y2' coupled to it and Y2 has different properties from stripe Y3. Stripe Y3 has Electret Y3' coupled to it. When acoustic sensor 100 is touched by a finger, such as the index finger, an acoustical signature is produced unique to the index finger. Other fingers touching sensor 100 produce different acoustical signatures. When the index finger touches 102, an acoustical signature is produced unique to the index finger. Other fingers touching sensor 102 produce different acoustical signatures. However, because stripes Y2 and Y3 are made of materials having different properties, the acoustical signature of the index finger associated with sensor Y2 is different from the signature associated with Y3. Thus the acoustical signatures are unique, depending upon which finger is used to touch the sensor and which sensor is touched.

It should be noted that, while the term acoustic and derivations thereof are used throughout this specification, the use thereof should not be seen as limiting. Signals, waveforms, or vibrations having frequencies other than those in the acoustical range are envisioned within the spirit and scope of the present invention.

While direct coupling of transducers to the stripes has been shown, it is within the spirit and scope of the present invention, wherein the transducers are not directly coupled to the stripes. Rather, single or multiple transducers, are used to pick up the acoustic signature transmitted through the air or other equivalent medium. However, because the coupling of the acoustic signature to the transducer through the air causes increased attenuation and distortion than direct coupling of the transducers, it is more advantageous to directly couple the transducers. Additionally, rather than utilizing discrete stripes of differing properties, a single sheet of material having a gradient of properties is used with the transducers coupled to the sheet to provide distinct areas of acoustic sensors.

Figure 2:
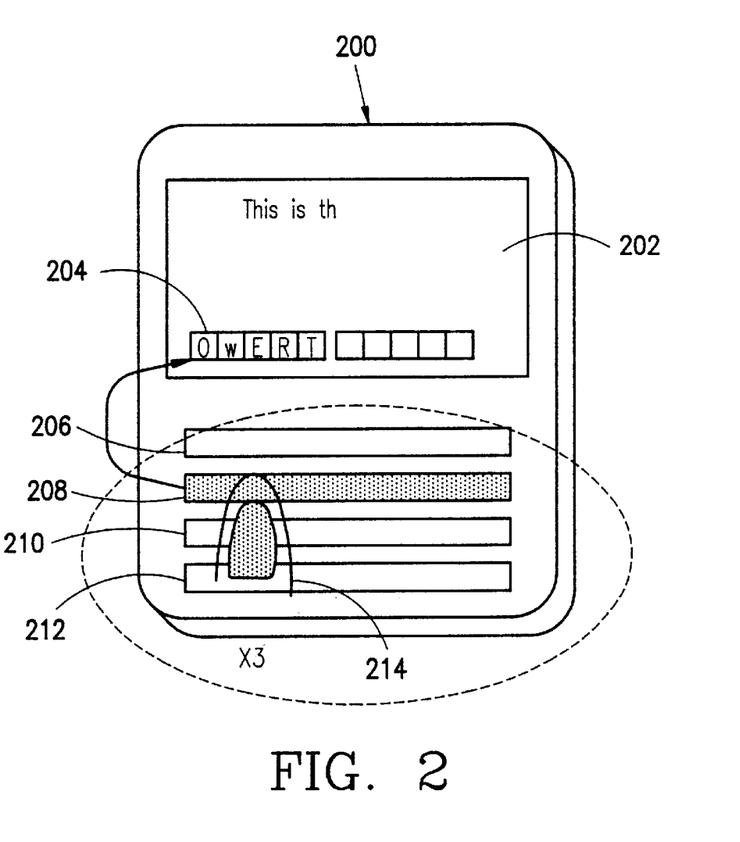
FIG. 2 illustrates an embodiment of the virtual keyboard with a display.

FIG. 2 shows a preferred embodiment of the present invention. Electronic device 200 has display 202, visual feedback 204, and four rows of parallel acoustic sensors 206, 208, 210, and 212. Each row of acoustic sensors corresponds to a row on a traditional keyboard. For example, sensor 208 corresponds to the row beginning with the letters QWERTY on a traditional qwerty style keyboard. When a user taps row 208 with the middle finger of their left hand 214, an acoustical signature is generated. This signature is then analyzed and the desired character input is determined from the identity of this acoustical signature. Visual feedback 204 shows the neighboring characters of the selected character and highlights the selected character. Shown is the selection of the character "E". The visual feedback 204 shows the keys neighboring "E", i.e. QWRTY, and shows the character "E" highlighted. The display additionally shows the previously typed characters.

Figure 3:
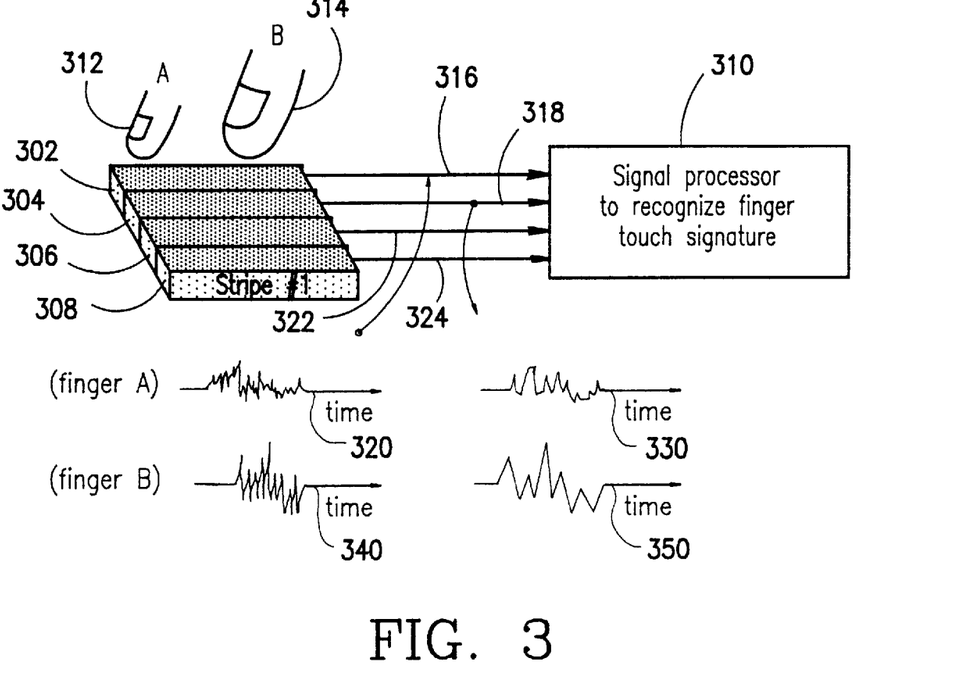
FIG. 3 illustrates unique acoustical signatures for different fingers and acoustical sensors.

In FIG. 3, acoustical sensors 302, 304, 306 and 308 are fashioned from different materials or otherwise designed so as to have different properties such that when each is struck by the same finger different acoustical signals are produced. These acoustical signals are analyzed by an analyzer such as signal processor 310.

When finger 312 touches sensor 302, it produces a signal as shown by the waveform of 320. However, when finger 312 touches sensor 304, it produces a different waveform 330 because of the different properties of the acoustical sensors. Alternately, when finger 314 is used to touch sensor 302, it produces a waveform 340 which is different from the waveform 320 produced by finger 312 touching sensor 302, due to the different properties of the fingers such as mass and shape. Additionally, when finger 314 touches sensor 304, it produces another waveform 350 which is distinct from the other waveforms produced. The other sensors 306 and 308 will produce distinct waveforms correlated to the fingers used to touch the sensor. Each of these waveforms provide an acoustic signature, indicative of the finger used and sensor touched. By feeding these signals via signal paths 316, 318, 322 and 324 to a signal processor, they can be analyzed and the finger and sensor touched determined. Signal paths 316, 318, 322 and 324 can be any means of transmitting an electrical signal.

Figure 4:
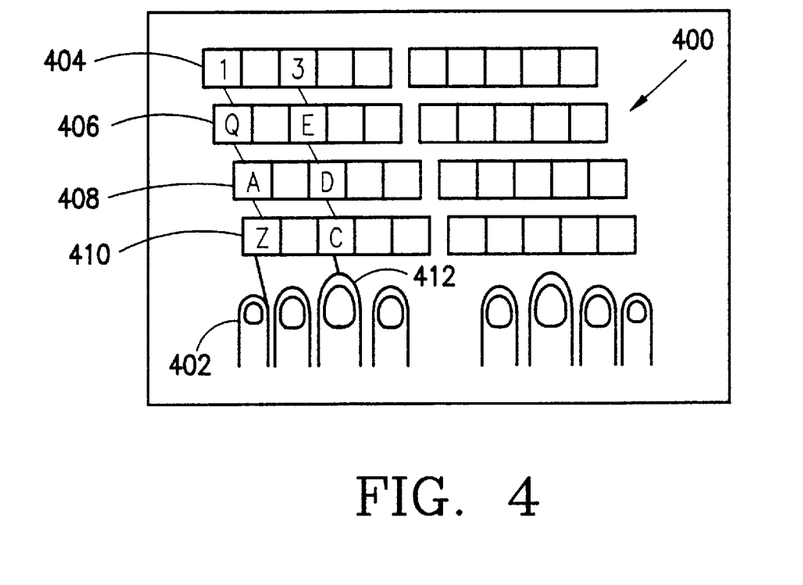
FIG. 4 illustrates a typists use of a conventional keyboard.

A traditional touch typist manner of typing is used in conjunction with the above descriptions, in the preferred embodiment, to provide a virtual keyboard FIG. 4 shows a representation of a conventional keyboard and the fingers of a traditional touch typist. A touch typist uses a specific finger to type a specific character on a traditional QWERTY type keyboard. The touch typist will use their finger 402 to type the characters "1", "Q", "A" and "Z" by pressing keys 404, 406, 408, and 410 of the conventional keyboard. Another finger 412 will be used to type the characters "3", "E", "D", "C". For a touch typist, the character in a specific row is associated with a specific finger.

Figure 5:
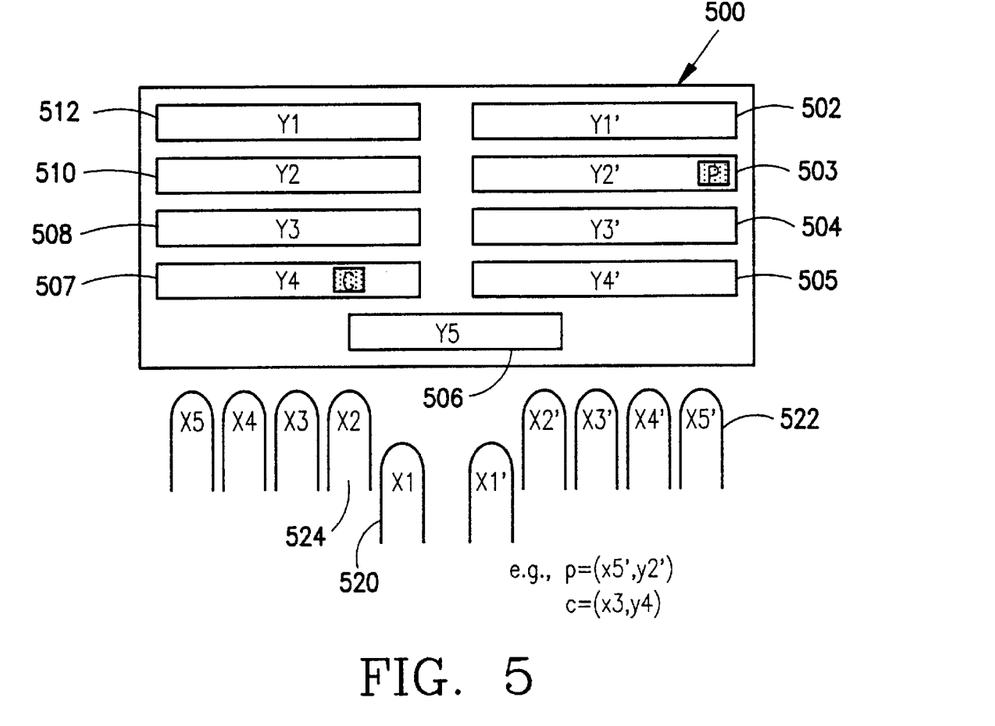
FIG. 5 illustrates one embodiment of a virtual keyboard.

By replacing the rows of keys of the conventional keyboard with rows of acoustical sensors as shown in FIG. 5, a virtual keyboard can be implemented for use with, for example, a palm top PC. Instead of the hardwired keys, each character is associated with an acoustical sensor 502–512 and the finger which touches the acoustical sensor. For instance, to type the character "P", the typist touches acoustical sensor 503 with pinkie finger 522. The character "P" is associated with the unique signature of finger 522 touching sensor 503. It is advantageous to indicate to a user where the home row of the keyboard is. Traditionally, on a conventional qwerty style keyboard, the home row is the row with the keys ASDF and this is the row that a touch typist rests their fingers to begin typing. In the present invention, an indication of the home row is indicated by raised portions on the sensors corresponding to the home row, similar to the technique used in conventional keyboards.

The signal produced by sensor 503 is independent of where finger 522 touches sensor 503. Therefore, the finite spacing between the keys of a row is eliminated as the character to be typed is no longer associated with the position the finger strikes the board, rather it is dependent on which finger strikes the particular sensor. Additionally, the vertical distance between the rows only needs to be large enough to prevent a finger from striking two sensors at a time. Therefore, the vertical distance only needs to be the spot size of a finger. However, as long as means are provided for preventing the finger from striking two sensors, the vertical distance can be made as small as desired.

Figure 6:
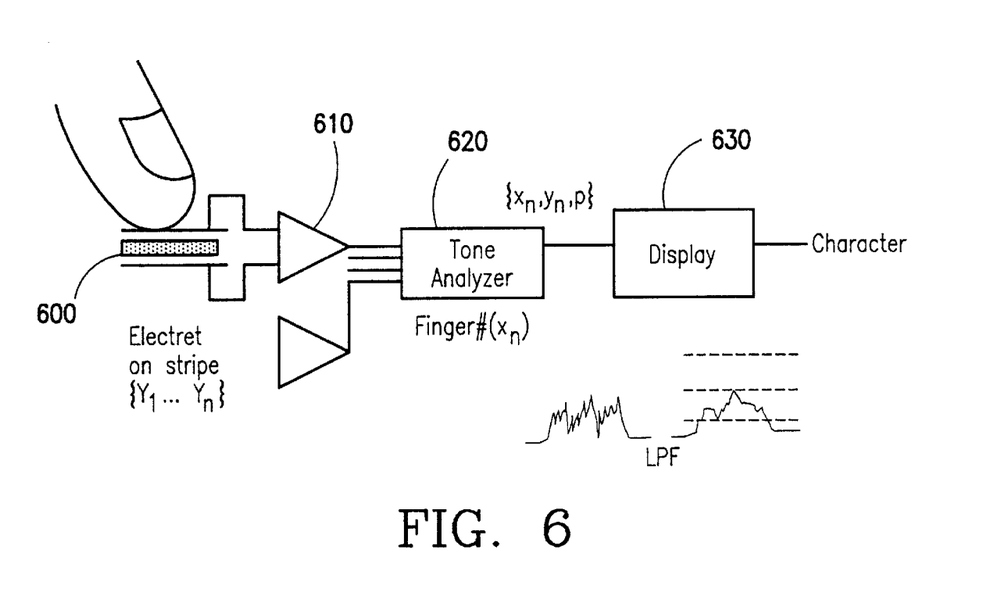
FIG. 6 illustrates an acoustical sensor, analyzer and display of the present invention.

The output of each sensor is amplified and provided to an associated input of, signal processor 620. FIG. 6 demonstrates such an arrangement. The output of acoustic sensor 600 is amplified by amplifier 610 and provided to one of the inputs of signal processor 620. The signal processor 620 then analyzes the input signals to determine the sensor touched and finger used to touch the sensor. After analysis, signal processor 620 outputs a signal indicative of the character corresponding to the row and finger to display device 630 which then displays the appropriate character. It should be noted that other elements well known in the art, such as a display buffer, memory, etc., make up part of the display system or are additionally connected to the signal processor, but, have not been shown for clarity. With the arrangement demonstrated in FIG. 6, each row is associated with a specific input of signal processor 620. Therefore, the row is determined based upon which input of signal processor 620 the signal is input to. By using separate inputs, the complexity of the analysis may be reduced. Alternatively, by employing stripes of different materials, as described above, a single input to signal processor 620 is used and the unique signatures associated with each stripe is utilized to determine the row. This embodiment allows for a simpler signal processor. Additionally, the present invention has been described using a single signal processor. However, because some individuals have difficulty keeping their right-hand fingers and left-hand fingers from striking the keys simultaneously, it is advantageous in one embodiment to use two signal processors, one for the right-hand fingers and one for the left-hand fingers.

Acoustical signatures are differentiated by their frequency components. The frequency components of the acoustic signature can be represented by:

$$P = \Sigma [a_n(t) \sin(\omega_n t + \phi_n)],$$

summing over n

Each unique signature is represented by a set of a, $\omega$, and $\phi$ for each combination of finger and acoustic sensors. The signal processor 420 takes the input signals and passes them through matched filters that are built from previously determined values of $a_n$, $\omega_n$ and $\phi_n$.

In order to obtain the matched filters, a learning process establishes the acoustic signatures and corresponding matched filters for each finger and row combination. By typing a pre-made paragraph containing the possible combinations of key strikes, (i.e., using all the fingers) the acoustic signatures are determined and used to construct the matched filters.

Different actions, other than simple touching of the sensor, produce different signatures which are used to provide additional inputs or to further differentiate keys. For instance, a typist uses their left index finger to type the characters "F" and "G", which are located on the same row. However, when the typist moves to type "G" they slide their index finger across the board from F to "G". The sliding of a finger across the board produces a different signature than other actions such as tapping. By identifying a slide, then tap by the left index finger on the sensor corresponding to the home row of the keyboard, the character "G" can be identified.

The sliding action produces, a lighter pressure on the sensor and the tapping action produces a higher pressure. The sliding action produces a long time duration signal with rich lower frequency components, while a tapping action produces a signal of short duration and crisp high frequency components. Thus, the detection of an acoustic signal with a long duration/low frequency components followed by a short high pressure/higher frequency ending indicates the typist attempts to slide and type. If this occurs on the middle row, and for example, is made from the left hand index finger, the typist is typing "G."

Figure 7A:
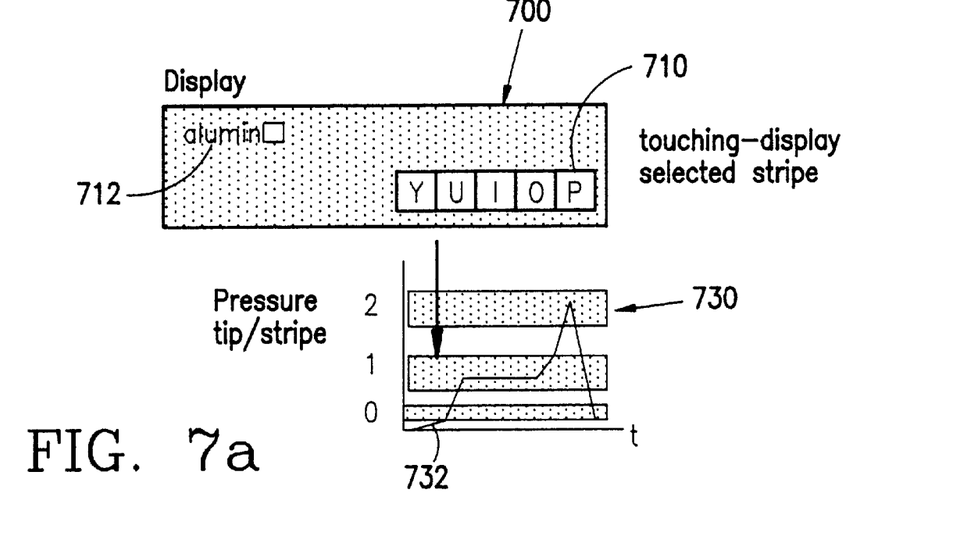
FIGS. 7a, 7b, and 7c, collectively, illustrate the visual feedback and corresponding pressures applied to the keyboard for a sequence of multiple-finger typing.
Figure 7B:
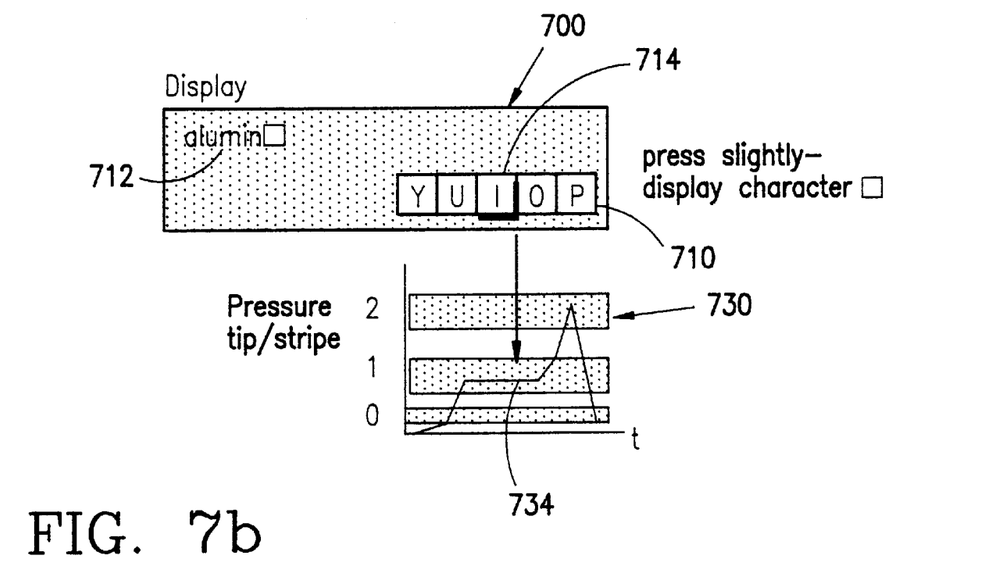
Figure 7C:
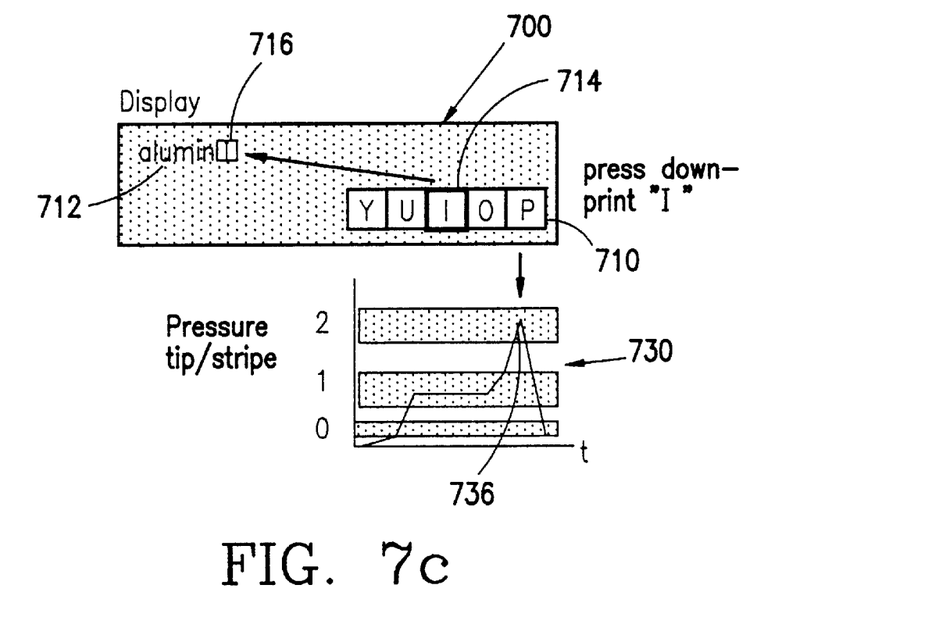

The present invention includes a display of possible character selections as the user makes contact with various rows and various finders. Visual feedback is important to determine whether the intended character to be typed is indeed the one input and to further assist a new or novice typist. As shown in FIG. 7a, the display device 700 displays the characters that have been previously typed 712. The distinguishable pressure levels are shown at 730. When the user touches the keyboard, the pressure is in the vicinity of a distinguishable pressure level. When the pressure applied 732 is in the vicinity of the first level, the letters associated with that stripe are displayed 710. FIG. 7b shows that, by applying more pressure 734, the character associated with the finger and row 714 is shadowed. Finally, as shown in FIG. 7c, when the pressure applied 736 reaches the third level, the final character is selected 516 and the corresponding display of the character 714 is highlighted. The selected character is then added 716 to the previously typed characters 712.

Figure 8A:
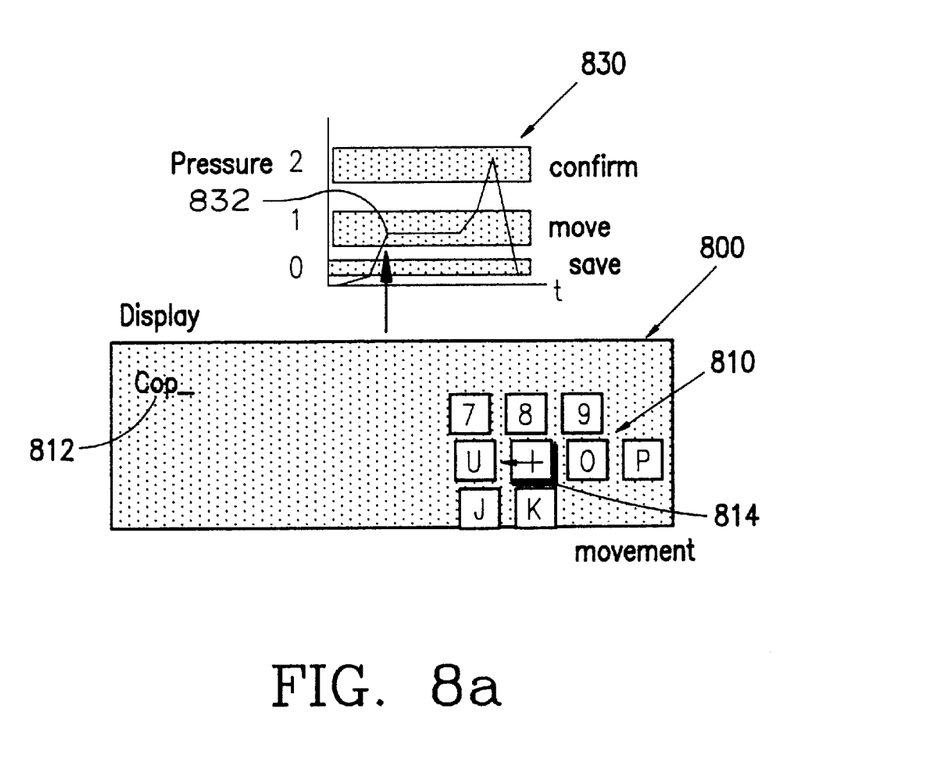
FIGS. 8a, 8b, 8c, and 8d, collectively, illustrate the visual feedback and corresponding pressures applied to the keyboard of the present invention for single-finger typing.
Figure 8B:
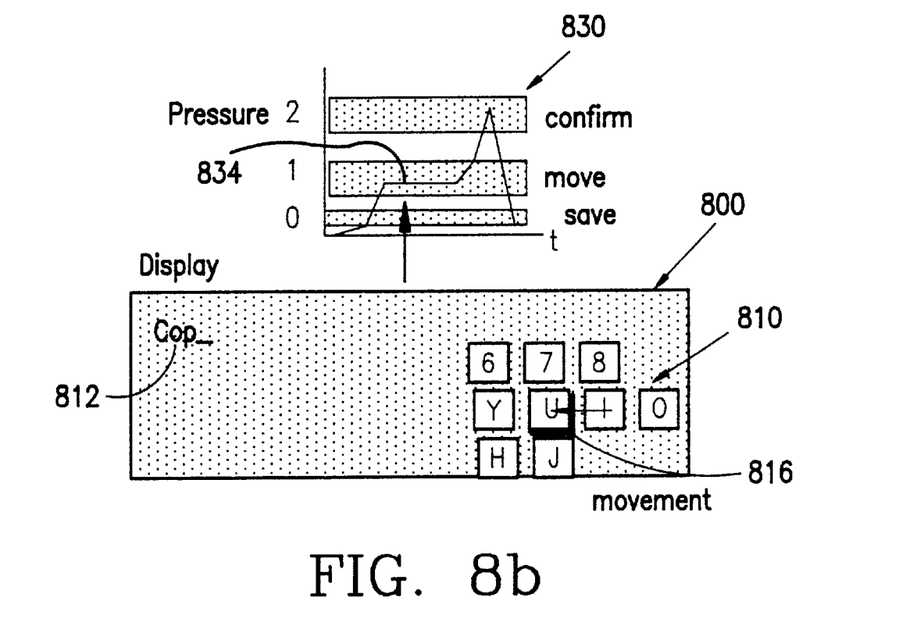
Figure 8C:
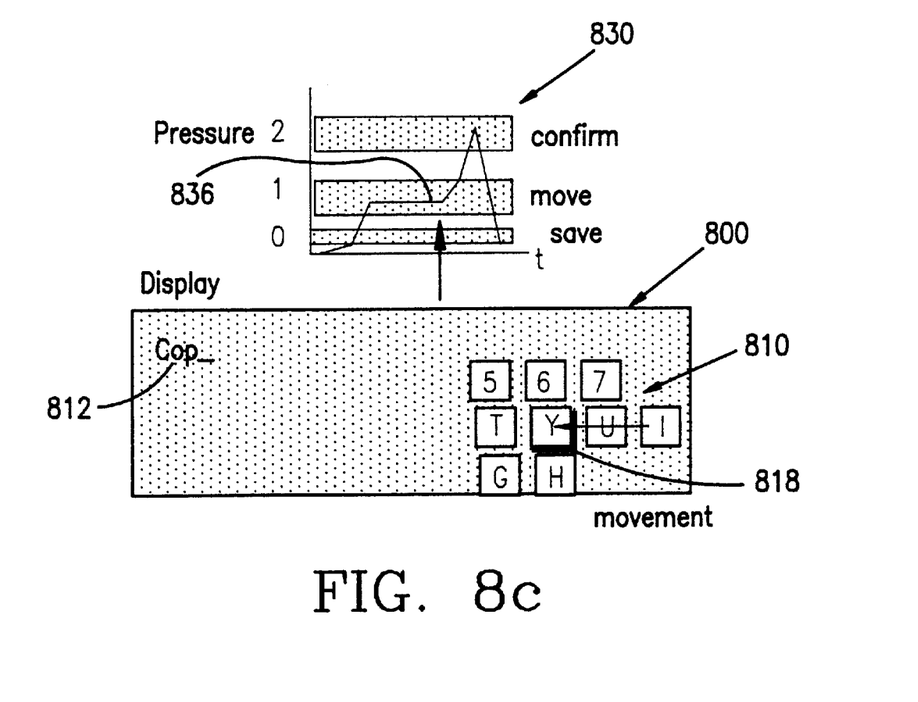
Figure 8D:
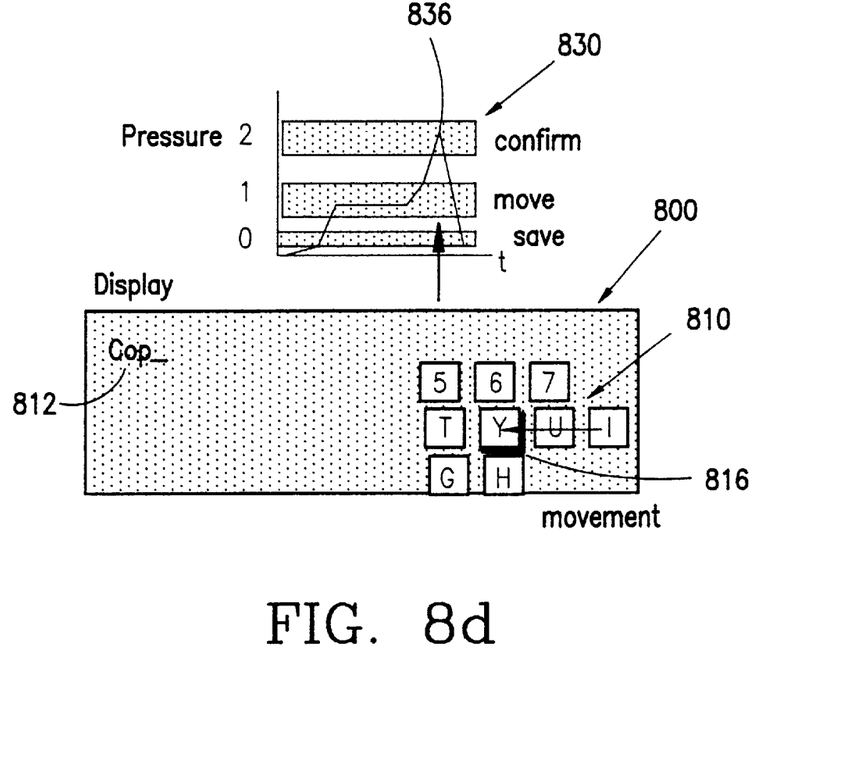

FIGS. 8a–8d demonstrate an alternate embodiment of the present invention having a single-finger or stylus mode of typing. This mode is useful for people who are not comfortable using the touch typing style of typing, yet may still wish to use the electronic device having the virtual keyboard. In the single-finger mode, each row of sensors still corresponds to a row of keys on a conventional keyboard. However, when the user places their finger on the board and presses, a display of a preliminary choice of an input character and neighboring characters 810 is shown on the display device 800. The preliminary choice of an input character is indicated by a shadow 814. By sliding the finger across the sensor, the choice of an input character is changed in the direction the user's finger is being moved. As can be seen in FIGS. 8a–8c, the selected character moves from I 814 to U 816. By iteratively sliding the finger across the sensor the selected character moves from U 816 to Y 818. The distinguishable pressure levels are shown at 830. When sliding their finger across the keyboard, the pressure applied stays substantially constant 832 and 834. By increasing the pressure to the board 836, the user selects the character to be input and the character is highlighted 816.

Figure 8E:
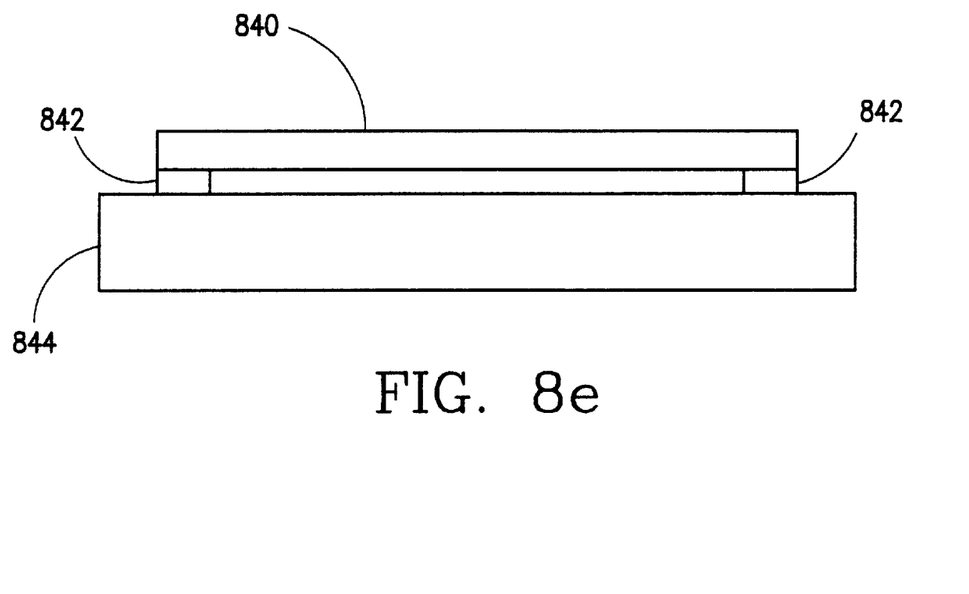
FIG. 8e illustrates an arrangement of transducers and stripe utilized to determine direction of a slide.

In order to determine the direction of a slide in the stylus mode of typing, an arrangement of transducers as shown in FIG. 8e is utilized. One side of transducers 842 are attached to base 844 in a space relationship to one another. Stripe 840 is coupled to the opposite side of transducers 842 such that transducers 842 are positioned at opposite ends thereof. By placing the transducers 842 in a spaced relationship to one another, at opposite ends of the stripe 840, the direction of sliding is determined. Due to the fact that the vibrations travel at a finite speed through the stripe, a Doppler shift is produced between the two sensors. For instance, when a user slides to the right, the right sensor will detect the vibrations with a small Doppler shift in frequency up, while the left sensor detects a small downshift. From the Doppler shift, the direction of the slide is determined.

Figure 9:
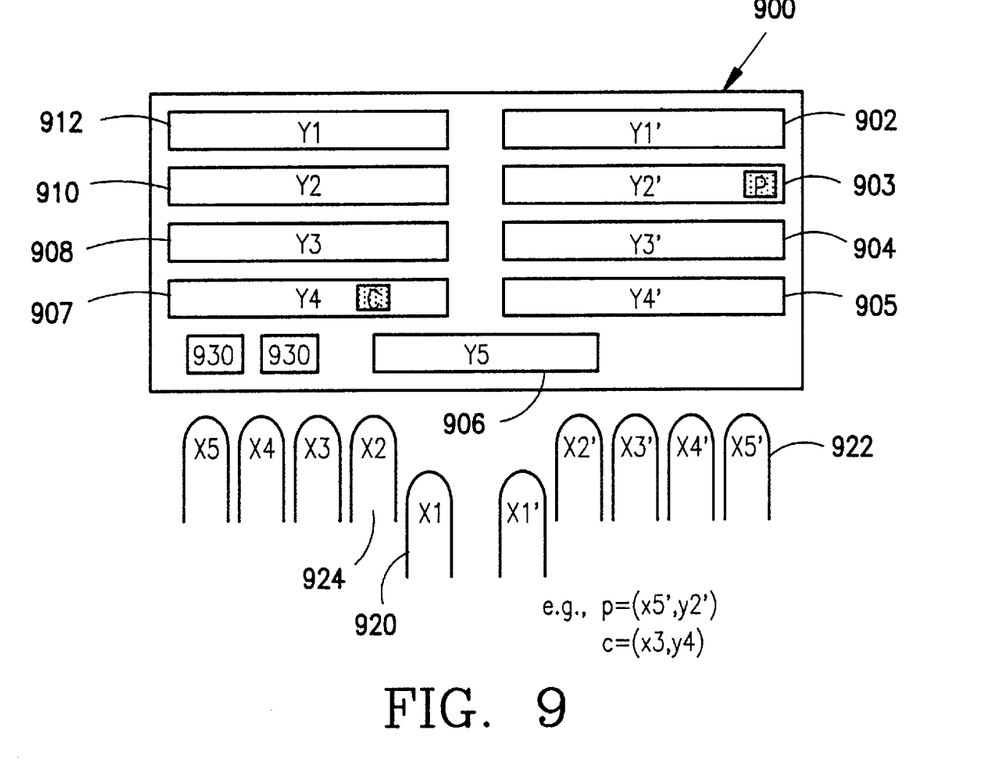
FIG. 9 illustrates an alternative embodiment of the virtual keyboard combined with hardwired keys.

Many electronic devices have input keys which are not associated with a particular finger for all touch typists. For example, a conventional keyboard for a personal computer has a row of function keys, a key designated as a control key and an alt key. Due to this, another embodiment of the present invention combines the virtual keyboard of the present invention with traditional hardwired keys. In FIG. 9, a keyboard is shown which is similar to the keyboard of FIG. 6 except that it has hard-wired keys 930 in addition to the sensors 902–912. The exact functions of the hard-wired keys are dependent upon the device the keyboard of the present invention is to be used with. Many functions can be hard-wired without departing from the scope of the present invention. However, it is also contemplated within the scope of the invention to add additional acoustic sensors for these auxiliary function keys that function similar to the virtual keyboard of the present invention.

Figure 10:
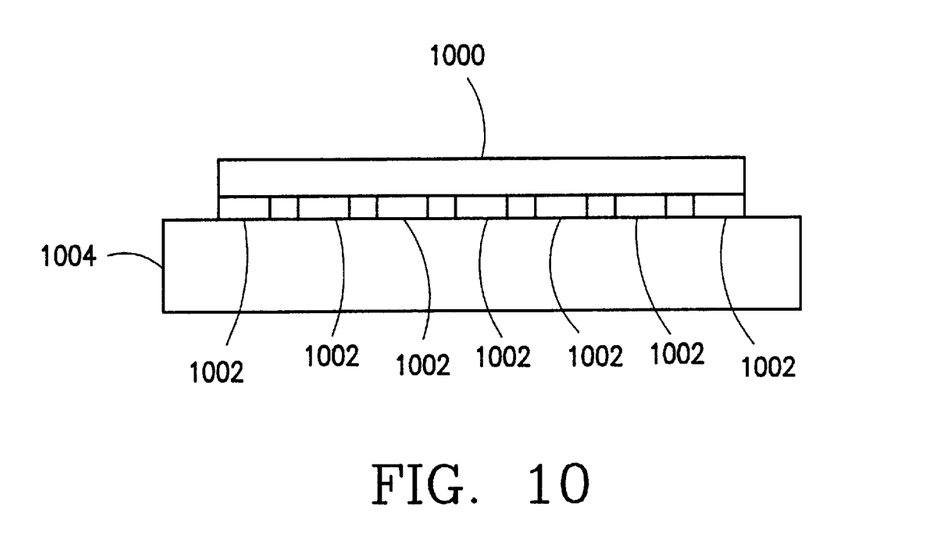
FIG. 10 illustrates an arrangement of transducers and stripes.

In another embodiment of the present invention, illustrated in FIG. 10, multiple transducers 1002 are attached to base 1004 and coupled to stripe 1000. The keyboard comprises multiple stripes of differing properties having multiple transducers coupled to the stripes. This arrangement provides a grid of transducers, which can be used to obtain positional information. By gathering positional information in conjunction with the acoustical sensors, the performance of the signal processor is improved and the accuracy is increased. Unlike the prior art which uses positional information, wherein a specific position corresponds to a specific key, the positional information obtained in the present invention helps to determine which finger is used to touch the stripe. When a touch typist types a specific key, generally the finger used to type that key will touch the same generally area each time. However, rather than designating a specific area, which corresponds to a key, the present invention learns the area typically touched by the typist and uses this information to later assist in determining, which finger is touching the stripe. The distinction between rows on the keyboard is provided by the different acoustical signature for each finger provided by the stripes having differing properties as previously described. By utilizing both the acoustical signature along with positional information the accuracy of detection is improved.

The signal processor of the present invention may be any device which is suitable for identifying characteristics of the electrical signals produced by the acoustic sensors and which can use those characteristics to identify the finger used to touch the acoustical sensor. A general purpose micro processor running software designed to perform the appropriate functions, a tone analyzer, a digital signal processor, an application specific integrated circuit, or functional equivalents are all contemplated within the scope of the present invention.

The above enhancements for input devices and its described functional elements are implemented in various environments. It is contemplated that the most beneficial use of the present invention is in the area of small, portable electronic devices requiring alpha-numeric input. For example, the present invention may be implemented on cellular phones, pagers, palm top PCs and the panels of portable instruments such as oscilliscopes and recorders. While these devices are contemplated as receiving the most benefit from the present invention, the present invention is equally applicable to all devices which require a keyboard to input alphabet, numeric or alpha-numeric input. For example, fax machines, desk top PCs, conventional telephones, television remotes, and conventional oscilliscopes would all benefit from the use of the present invention.

CONCLUSION

A system and method has been shown in the above embodiments for the effective implementation of a virtual keyboard. While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by size, environment, specific materials, computing hardware, or specific methods of identifying the acoustic signature. In addition, the specific chosen sensor layouts and key character assignments are representative of the preferred embodiment and should not limit the scope of the invention. Dvorak, stenographic shorthand, and chording keyboards are examples of other character assignment and layout schemes which benefit from the present invention. More or less than three levels of pressure can be distinguished and utilized. Kanji, Cyrillic and all other forms of input representations, including English alphabet and Arabic numerals, are contemplated under the term alpha-numeric and thus within the scope of the present invention.

What is claimed is:

1. An alpha-numeric character entry device comprising:
   a plurality of substantially parallel, spaced rows of acoustic sensors, each of said acoustic sensors being associated with a set of alpha-numeric characters, at least one of said acoustic sensors receiving an input alpha-numeric character characterized by an acoustical signature, said acoustical signature corresponding to a specific alpha-numeric character of said set associated with said at least one acoustic sensor, each of said sensors having an output which provides an electrical signal representative of said input;
   a signal processor operatively connected to said output; and
   a display for displaying at least one set of characters associated with at least one acoustic sensor, said input alpha-numeric character and at least one previously input alpha-numeric character;
   wherein said signal processor determines at least one spectral characteristic of said acoustical signature, determines which of said specific characters said acoustical signature corresponds to and the set of characters to which said specific character is a part of, and provides an output representative of said specific character corresponding with said acoustical signature and the set of characters to which said input character is a part of.

2. An alpha-numeric character entry device, as per claim 1, wherein said rows comprise at least four rows.

3. An alpha-numeric character entry device, as per claim 1, wherein said sets are chosen such that a traditional keyboard layout is provided.

4. An alpha-numeric character entry device, as per claim 1, wherein said time domain amplitude is utilized to determine pressure applied to said sensors.

5. An alpha-numeric character entry device, as per claim 4, further comprising,
   said display device displaying said characters associated with a sensor when a first level of pressure is applied to said sensor,
   said display device shadowing a character of said characters displayed when a second level of pressure is applied to said sensor
   said display device highlighting said shadowed character when a third level of pressure is applied to said sensor.

6. An alpha-numeric character entry device, as per claim 5, wherein said third level of pressure is greater than said second level, said second level is greater than said first level.

7. An alpha-numeric character entry device, as per claim 1, wherein said frequency spectrum of said acoustical signature is utilized to determine said corresponding alpha-numeric character.

8. An alpha-numeric character entry device, as per claim 1, further comprising multiple modes of input.

9. An alpha-numeric character entry device, as per claim 8, wherein one of said multiple modes is a stylus mode.

10. An alpha-numeric character entry device, as per claim 1, further comprising hard-wired keys.

* * * * *